United States Patent [19]

George

[11] Patent Number: 4,649,794

[45] Date of Patent: Mar. 17, 1987

[54] VISUAL METRONOME

[76] Inventor: Burrell F. George, 246 Chalfont Rd., Winnipeg, Manitoba, Canada, R3R 0R3

[21] Appl. No.: 812,000

[22] Filed: Dec. 23, 1985

[51] Int. Cl.4 .............................................. G01B 15/00

[52] U.S. Cl. ................................ 84/484; 340/815.01; 340/815.21

[58] Field of Search .............. 84/477, 484; 340/384 E, 340/815.12, 815.15, 815.21, 815.23, 815.27

[56] References Cited

U.S. PATENT DOCUMENTS

| | | | |
|---|---|---|---|
| 4,014,167 | 3/1977 | Hasegawa et al. | 84/484 |
| 4,193,257 | 3/1980 | Watkins | 84/484 |
| 4,321,853 | 3/1982 | Tumblin | 84/484 |

*Primary Examiner*—L. T. Hix

*Assistant Examiner*—David M. Gray

*Attorney, Agent, or Firm*—Stanley G. Ade; Adrian D. Battison

[57] ABSTRACT

A visual electronic metronome comprises a plurality of LED's arranged in a first V-shaped column and a second column extending downwardly from the top of the V. The LED's are actuated in turn so as to produce the appearance of a block of light moving along the V-shaped column and then down the second column until a leading edge of the block of light reaches the bottom of the column. At that point a strobe light produces a flash indicative of the intended beat. The user can thus observe the approach of the beat and meet it exactly preparing the muscles for playing the instrument according to the visually observed position of the block of light approaching the beat.

11 Claims, 2 Drawing Figures

VISUAL METRONOME

BACKGROUND OF THE INVENTION

This invention relates to a silent, visual metronome for use in assisting music students in developing skills of timing and rhythm; for use in assisting groups of vocalists and/or instrumentalists in co-ordinating non-uniformly developed timing and rhythmic abilities; and for use in assisting anyone seeking improved efficiency in coping with a situation which requires voluntary delivery of a muscular response at exactly the right moment.

As any musician is well aware, timing and rhythm are vital functions in the process of making music. Accordingly, as the multitude of muscular operations necessary to produce musical sounds are assimilated by a student as "technique", timing and rhythm must also be absorbed, if a performer is to bring music to life, for music is an art of timing and rhythm.

In its application to music, rhythm is the factor which determines the method in which the progressive movement of a tonal picture is conducted, its speed, its regular units of uniform time intervals (and each interval's "beat", or initial accent of a measure), its alternate relaxing and speeding up, its pauses, the entire machinery of the moving tonal picture.

The early acceptance of the conventional metronome by music teachers over the world suggests that skills of timing and rhythm may be as difficult for many to acquire as technical ability to play notes. However, there are users of a conventional metronome who would discount its utility value as an aid in acquiring those skills. Accordingly, the paragraphs to follow attempt to suggest that a device which marks the boundaries of successive intervals of time by sound does leave something to be desired by those who conscientiously seek to acquire skills of timing and rhythm.

It is essential that the user of a conventional metronome discriminate the time difference between the accented sound which the user intends to have fall on the first beat of each measure and the beat of the metronome. That perception serves the user as a guide in learning to make the necessary corrective adjustments of an on-going pattern of muscular movements. Essentially, the beat sound of a metronome serves to confirm whether the player is or is not meeting the beat. And these discriminations become increasingly difficult as the beat of the metronome and the user's accented sound approach unison. But discrimination is essential and its difficulty is unavoidable for anyone seeking these skills. Similarly, achievement in linking together groups of notes with their proper time values so that all fall within the boundary of two successive beats of a metronome depends upon the time-difference discrimination.

If one bears in mind that the metronome's sound occurs only at the instant a response is to be executed, it would seem safe to assume that a user's attention becomes concentrated upon identifying the occurrence of that particular sound. This is to suggest that the user is, in effect, rapidly and unwittingly seduced into a characteristic state of readiness for action. But, as everyone knows, such states readily disintegrate in muscular discharge when too prolonged, or when too rapidly mobilized to an optimal level. The consequent frustrations on failure to meet the beat, or to stay with it, will commonly arouse greater effort. But heightened levels of motivation generally have the effect of restricting one's flexibility of voluntary control over patterns of muscular responses. It is somewhat thuswise that a user of the conventional metronome struggles to achieve voluntary control of muscular patterns of response that get disintegrated by incommensurate states of readiness.

A closer view of this matter reveals the user is confronted with two inter-related difficulties: the timing of the first response to meet the beat, which depends upon a foreperiod interval of readiness to act; and, the difficulty of establishing even executions of rhythmic accents and subsequent weaker beats within the measure. It is to be noted that successful performance of this latter difficulty requires giving equal durations to notes of equal time value. A more complex difficulty of this sort is the precise ratioing of the time durations of notes of unequal values.

This difficulty of covering a unit interval of time with a certain number of discrete musical sounds may be suggested by describing a characteristic which we all share, investigated and identified by experimental psychologists and called Central Tendency.

Given the task of reproducing a standard length of line, or an interval of time, subjects perceived, or were informed of their deviations from the standard. The deviations of course were either an under or overestimate of the standard. Early in the trials subjects established a system of positive and negative errors. As the system developed with successive trials, an overestimate, for example, was less severely "corrected" by an under-estimate on the next trial. And accordingly, errors became smaller and smaller until their reproductions were closely accurate.

Since the earliest days of music teachers, many a conscientious teacher guided a pupil's hand according to the beat of the rhythm of the music played. The beat was lengthened at the long notes and shortened and quickened with the shorter notes. Thuswise all movement of the music was expressed by a similar movement of the hand. And as a consequence, students came to understand that rhythm is movement through time, regular and/or irregular, and to appreciate how it is that rhythm vitalizes an entire mass of sound.

It is one object of the present invention therefore to provide an improved metronome.

SUMMARY OF THE INVENTION

According to the invention therefore, there is provided a visual metronome for observing by a user comprising first light emitting means in the form of an elongate column, means mounting said column for simultaneous viewing of the length of the column by the user, said light emitting means being arranged such that portions of the column are selectively operable to provide an illuminated part of the column and a non-illuminated part of the column divided by a line traverse to the column, a second light emitting means arranged to produce an instantaneous flash visible by the user brighter than said first light emitting means, and a control means arranged such that the portions of said light emitting means are operated to advance said line along the column towards one end thereof and to actuate said second light emitting means simultaneously with said line reaching said one end.

My concept of an improved metronome is a silent, visual device which allows its user to observe the passage of the full duration of a selected unit interval of time. It would do this by means of a constant rate of (apparent) downward movement of a bar of illumination along a vertical column of fixed length, thus objectifying the passage of time. As with a conventional device, a flash of more intense illumination would mark the beat ("a flashbeat") enabling user-difference discriminations as previously described. Its essential advantage over a conventional metronome would be the provision of constant visual stimulation for the viewer throughout the entire duration of a selected unit of time. Its user would experience little or no challenge to control heightened states of readiness to respond, or need to fill the duration of a unit interval with unprofessional muscular activity of foot-tapping, or the like.

My concept translates a unit interval of time into a constant rate of movement along two tracks of fixed length. The method of translation would employ a light stimulus moving at a constant rate of speed along the two tracks of equal length. A graphic illustration of the two tracks would define the pathway of movement made by a musical conductor in giving his players a preparatory or initial up-beat indicating the tempo at which they are to take and the subsequent downbeat which starts them off in unison. Since all movement is relative and occurs with respect to a frame of reference, lights of constant illumination are positioned at the terminals of the tracks.

The up and downbeat tracks comprise equal length columns of evenly spaced stationary sources of illumination joined at their uppermost ends. One leg is vertically positioned and displays downward movement of illumination. The other leg, to the left of the vertical leg, is physically inclined away from its uppermost junction with the vertical leg, and just enough to position its base-end in same horizontal plane (very nearly) as the base-end of the vertical leg. The upbeat track at the left thus appears to be leaning against the top end of the downbeat track. This arrangement is necessary to allow the user-viewer to perceive upward movement of illumination along the upbeat track as clearly distinct and separate from downward movement of illumination along the vertical downbeat track at the right.

With reference to the use of the downbeat track in timing of a response to meet the beat, it is intended that the user-viewer perceive a moving bar of illumination in a downward course approaching the reference lights at the base of the track. It is further intended that the user-viewer will thereby, in effect, be enabled to visually discriminate a range of length differences between the two lights (the one moving and the one stationary) within which range of differences preparatory set for action is at its optimal level for voluntary execution of a muscular response at precisely the right moment.

By this means it is intended that a user-viewer may readily develop the primary timing skill upon which acquistion of related rhythmic skills is necessarily dependent.

With respect to the utility function of the upbeat track, it serves, like the conductor's upbeat, to display a movement of constant rate of speed informing players of the tempo of the rhythm to be initially executed in a performance.

An individual's state of readiness or "set" greatly influences the speed of response. In our daily experience we have learned that our efficiency in coping with a situation is greatest when we are fully prepared for it. The skillful hunter, lying in wait for a deer, pulls the trigger at exactly the right moment; the experienced driver, waiting at a stop-and-go traffic light will start his car quickly and smoothly as soon as the red changes to green. Examples of the importance of a preparatory set might be multiplied indefinitely.

The method just described takes account of two essential kinds of orientation or attitudes involved in skills of timing and rhythm. The two attitudes are subsumed by the common precept, "on your mark, get set, go," and are briefly described in the next two paragraphs.

A viewer in the sensory attitude directs attention as completely as possible to the appearance and subsequent movement of the visual stimulus. A user in the motor attitude, on the other hand, concentrates on the muscular response to be made at the instant the visual stimulus appears.

The two attitudes are of course only relatively sensorial or muscular. For even when attention is concentrated on a moving light stimulus there remains a certain minimum necessary readiness to make a muscular response. Indeed, many relatively inexperienced players find it difficult to maintain a sensory attitude toward the conductor's baton movements. Similarly, on the other hand, practiced players also tend toward a muscular attitude. Yet, extreme concentration on a muscular response still leaves a player in a state of readiness to "meet the beat" of the conductor's baton. Sensory and motor attitudes are necessarily associated.

With the foregoing in view, and other advantages as will become apparent to those skilled in the art to which this invention relates as this specification proceeds, the invention is herein described by reference to the accompanying drawings forming a part thereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
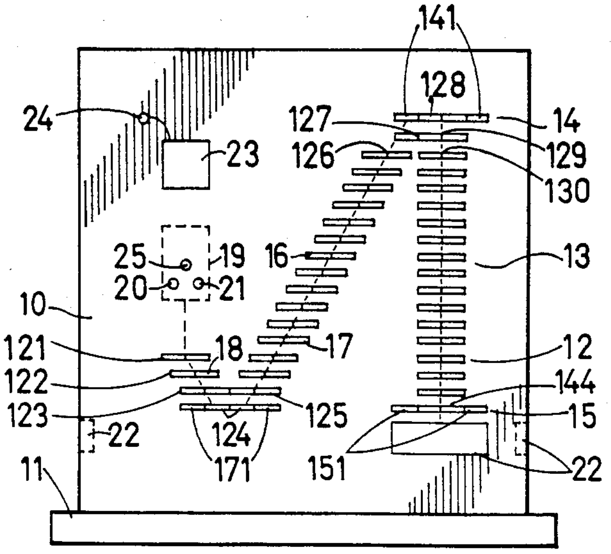
FIG. 1 is a schematic front elevational view of a metronome device according to the invention.

The metronome device according to the invention is generally indicated at 10 mounted upon a base 11 so that it can be positioned on a suitable surface for the front face of the device to be visible by a user who is a musician or student musician or by a group of musicians.

The front face includes a plurality of identical LED devices generally indicated at 12 each comprising a pair of such LEDs arranged in a first vertical column indicated at 13 with the LED devices 12 equally spaced in the column from an upper end 14 to a lower end 15. Interconnected with the column 13 is a second column 16 which is of a V-shape with an upwardly angled leg 17 joining the first column 13 at the upper end 14 and having a shorter downwardly extending leg 18.

A control unit is schematically indicated at 19 and will not be described in detail herein since the construction thereof will be well apparent to one skilled in the art of electronic engineering. It suffice to say, therefore, that the control unit 19 is arranged to individually control the LEDs 12 so that they can be actuated according to the pattern described hereinafter. The control unit 19 includes a pair of control knobs 20 and 21 which can be actuated to vary the control as will be explained hereinafter.

In addition to the LEDs, there is provided a strobe light which can be seen indirectly through panels in the side faces at any suitable position for example as shown schematically at 22.

Finally the front face includes an outlet 23 of a tone generator which can be actuated by a press switch 24 to generate a suitable tone for example A, at 440 cps, for tuning purposes for the musicians.

Additional reference LEDs are positioned at the top and bottom of the column 13, as indicated at 141, 151, and at the lowermost point of the column 17 as indicated at 171.

The LEDs 12 and strobe 22 are controlled to achieve the following function. A press switch 25 can be operated to start the procedure. On actuating the device by pressing the switch 25, the control unit 19 acts to illuminate firstly the LEDs 171, 141, and 151. These are retained during operation of the device. The LED pair 121 is then illuminated and cancelled following which a second LED pair 122 is illuminated and cancelled at a time period subsequent to the first. Following the same time period, the next LED's in the leg 18 are illuminated and cancelled as indicated at 123 and 124. This creates the appearance of a line of light moving along an imaginary line formed by the LED pairs 121 through 124.

This apparent movement continues to the LEDs 126 through 129 at the top of the leg 17 of the second column 16. It will be apparent that these LEDs also form a top end 14 of the column 13. At the uppermost position, defined by the pair 128 between the reference diodes 141 therefore, the control unit 19 arranges to turn on the next LEDs 129 and 130 in turn in the column 13 to give the impression of the line of light moving down the column 13.

This movement continues until the LED pair 131 between the reference diodes 151 are illuminated. It will be appreciated that the LED pair at any position in the two columns appears as a leading edge of light moving firstly along the column 16 and subsequently down the column 13.

The control unit 19 is arranged so that exactly simultaneously with the LED 144 being illuminated that is with the leading edge reaching the bottom of the column 13, the strobe light 22 is actuated to produce a flash of light significantly brighter than the light defined by the illuminated LEDs.

In one mode of operation, the control unit 19 is arranged to complete the movement of the light along the column 16 and subsequently down the column 13 for a fixed number of times preferably four times. Subsequent to the completion of the four complete movements of the light, the control unit 19 is arranged only to illuminate the LEDs in the column 13 so that the light apparently moves from the upper end 14 to the lower end 15 and again on achieving the lower end there is a simultaneous flash on the strobe 22. This operation then continues until the reset button 25 is again pressed to cancel the operation and to restart. On restarting the four complete movements are carried out following which the movement only in the column 13 is repeated until again halted.

The control knob 20 is arranged to vary the control unit 19 so as to vary the speed of apparent movement of the light, specifically by reducing the time period between illumination of the next LED. Thus the time between operations is varied to vary the timing of the music.

The control unit 19 also acts to operate the strobe light 22 separately from the lights in the column 13 in between each operation. Thus, for example in a 4/4 time, the column 13 is actuated and the strobe 22 operated when the LED 131 is illuminated as explained above so as to represent a first beat of the bar and subsequently the strobe 22 is operated three times to represent the second, third and fourth beats of the bar with the timing of course between the strobes being equal. The knob 21 of the control unit 19 is arranged to be operable to vary the time signature in accordance with well known musical principles so that the number of operations of the strobe in relation to the operation of the column 13 varies as required.

Thus the musicians can be readied by the four initial complete movements of the block of light through the column 16 and the column 13 knowing that on the fourth they must meet the beat which occurs when the LED 131 is illuminated and the simultaneous flash is provided by the strobe 22.

The eye of the player or user can carefully watch the leading edge of the block of light as it comes closer to the bottom of the column 15. Thus the musician can carefully monitor his state of readiness in dependence upon a visually narrowing gap so that he meets exactly the flash of the strobe 22 exactly on beat. This gives him a visual indication of the approaching beat as opposed to conventional metronomes where the beat is indicated solely by the sound produced by the device whereupon the user is given no indication of how to prepare for the sound or when it will occur.

When the device is turned on, the reference lights are immediately illuminated. Thus at the start of its operation, a viewer sees all reference lights "on" and the soon-to-move-stimulus light "on".

Now with the moving light stimulus departed from its starting point, it reaches the level of reference lights at the base of the up-beat track, at which level it reverses direction on beginning the up-beat interval of time. An instant after it reaches this pivotal point of its reversal, a secondary source of illumination causes a more intense flash of light to be emitted, thus signalizing to the user the starting instant of the up-beat interval.

Its upward movement terminates as it enters between the two adjacent reference lights positioned so as to serve both tracks.

At its uppermost terminal, the moving light again reverses direction to move downward along the vertical downbeat track. At the instant of its reversal, a more intense flash of light is emitted, signifying to the user that the up-beat is completed and the downbeat now commences.

The moving light continues downward at its constant rate, joins the two reference lights at the base of the track, as the more intense flash of light is emitted, and the first of the four up-beat and down-beat sequences is ended.

In the next instant the moving light is departing the base of the up-beat track and on its path toward the up-beat terminal. The moving light does not re-position itself at the original starting point, but maintains constant movement that objectifies (up-beat and down-beat, up-beat and down-beat, up-beat and down-beat) two unit intervals of time in succession. This phase may be called a synchronizing phase for it serves the function of displaying continuous movement through two equal durations, one informing the viewer of the duration of movement that is to follow in the next. By this method, performers of music may co-ordinate their starts and movement of successive progressions of notes.

In the next or second phase of its operation the visual metronome omits the up-beat movement of the stimulus light, and the viewer is presented with a downward movement of the light only during the first beat unit interval of the measure of the selected rhythm. The remaining beats or weaker beats of the measure are signaled by the relatively more intense flash of illumination. In a waltz rhythm for example, the falling bar of illumination is seen only through the duration of the first interval "one" and the end of interval "two" and interval "three" are signaled by the flash of light.

The metronome can provide a minimum rate of 40 flashes per minute. Its maximum rate may be expected to approach 180 per minute. In view of the desirability of producing smooth apparent movement over a fixed distance, it may be anticipated that as frequency of the beats increases, a frequency will be reached which produces the visual effect of simultaneous illumination over sections of the vertical column. This is to suggest that the range of useful frequencies for achieving apparent movement of a bar of illumination is limited by the length employed for its display.

The metronome provides its user with five rhythms: a one-unit interval per measure which presents the downward apparent movement throughout successive unit intervals terminated by the flash of light; a two-unit interval which displays the down-movement of apparent illumination only during the first unit terminated by the strobe light flash and the second interval terminated by the flash of light; a three-unit interval of which the first only is apparent movement terminated by a flash, and the remaining intervals marked by a flash; a four-unit interval displaying movement for the initial beat that is terminated by a flash of light, and followed by three equally intervaled flashes of light, indicating the terminations of the remaining weaker beats of the measure; and a six-unit interval or six-beat measure, with the first displayed by movement and the remaining five weaker beats terminated by equally intervaled flashes of light.

The visually perceptible flashbeats of the metronome will provide groups of players with adequate instantaneous stimulations that permit time-difference perceptions independent of their group sound. The moving light stimulus, visibly accessible at a distance of 25 feet, also allows its use by groups.

Figure 2:
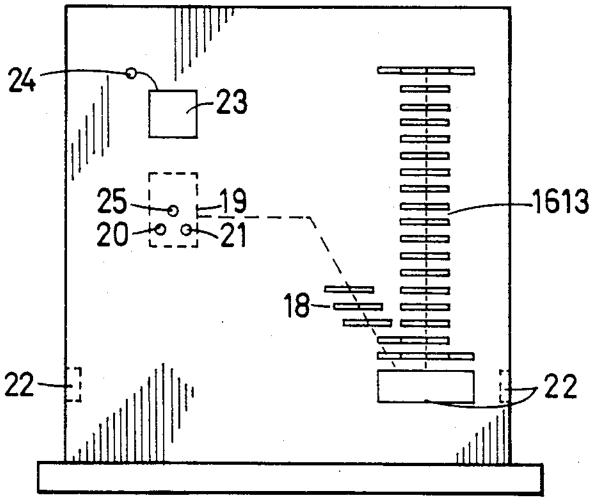
FIG. 2 is a view similar to FIG. 1 showing a second embodiment of metronome.

Turning now to FIG. 2, the device is modified relative to that of FIG. 1 in that the columns 16 and 13 are represented by the same LED devices. Thus the apparent movement of the illuminated LED travels firstly down the column 18 and then up and down the column indicated at 1613. This has the advantage of reducing the number of diodes employed but may reduce the visual effectiveness of the device.

In an alternative arrangement (not shown) the moving light can be represented by a number (e.g. four) of illuminated LED pairs with the middle pair representing the advancing dividing line of the up-beat movement and outside pairs the down-beat movement.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A visual metronome for observing by a user comprising first light emitting means in the form of an elongate column, means mounting said column for simultaneous viewing of the length of the column by the user, said light emitting means being arranged such that portions of the column are selectively operable to provide an illuminated part of the column and a non-illuminated part of the column divided by a line transverse to the column, a second light emitting means arranged to produce an instantaneous flash visible by the user brighter than said first light emitting means, and a control means arranged such that the portions of said light emitting means are operated to advance said line along the column towards one end thereof and to actuate said second light emitting means simultaneously with said line reaching said one end.

2. The invention according to claim 1 wherein the column is formed by a plurality of separate light sources.

3. The invention according to claim 1 wherein the control means is arranged to operate the portions so as to define a moving illuminated part of the column having a leading edge and to actuate said second light source simultaneously with said leading edge reaching said one end of the column.

4. The invention according to claim 1 wherein the control means is arranged to operate the portions so as to define a moving illuminated part of the column having a leading edge, a trailing edge and substantially constant length.

5. The invention according to claim 1 wherein the control means is arranged to operate said second light emitting means a plurality of times for each operation of said first light emitting means whereby said first can indicate a first beat of a bar of music and said second can indicate the first and/or other beats of the bar.

6. The invention according to claim 1 wherein the first light emitting means comprises a plurality of LED devices arranged in a line and wherein the control means is arranged to illuminate each in turn of said devices so as to give the appearance of a line of light moving at a constant speed along the column.

7. The invention according to claim 1 including a further column joining said column at an end thereof opposed to said one end and arranged at an angle thereto, said control means being arranged such that the line moves initially along said further column to said opposed end and subsequently moves along said column to said one end.

8. The invention according to claim 7 wherein the control means is arranged such that the line moves along said further column to and along said column a plurality of times following which it moves only along said column.

9. The invention according to claim 7 wherein the further column is V-shaped so that the line goes down a first leg of said V-shape, up a second leg of said V-shape and subsequently down said column to said one end.

10. The invention according to claim 1 including a tone generator for generating a tone suitable for tuning purposes.

11. The invention according to claim 1 including stationary reference lights at said one end of said column.

* * * * *